United States Patent [19]

DeClaire et al.

[11] Patent Number: 4,467,886

[45] Date of Patent: Aug. 28, 1984

[54] VEHICLE DRIVE CONTROL SYSTEM

[75] Inventors: Gerald DeClaire, Bloomfield Hills; Dennis Kramer, Troy, both of Mich.

[73] Assignee: Rockwell International Corporation, Pittsburgh, Pa.

[21] Appl. No.: 466,390

[22] Filed: Feb. 14, 1983

Related U.S. Application Data

[63] Continuation of Ser. No. 114,523, Jan. 23, 1980, abandoned.

[51] Int. Cl.³ .............................................. B60K 31/00
[52] U.S. Cl. .................................. 180/197; 74/710.5; 74/711; 361/238; 364/424
[58] Field of Search ............ 192/103 R, 0.033; 180/197, 76; 74/752 D, 710.5, 711; 324/378, 73 R; 340/635, 516; 364/424; 361/238; 303/104, 106, 110, 111; 73/117

[56] References Cited

U.S. PATENT DOCUMENTS

| | | | |
|---|---|---|---|
| 3,288,232 | 11/1966 | Sheppard | 74/711 X |
| 3,546,969 | 12/1970 | Gibson et al. | 74/711 |
| 3,702,206 | 11/1972 | Sweet | 303/111 |
| 3,740,103 | 6/1973 | Sweet et al. | 303/110 |
| 3,845,671 | 11/1974 | Sharp et al. | 74/710.5 |
| 3,866,979 | 2/1975 | Rabos et al. | 303/106 |
| 3,941,203 | 3/1976 | LeConte | 180/197 |
| 4,050,534 | 9/1977 | Nelson et al. | 180/76 X |
| 4,156,547 | 5/1979 | Marsh | 180/197 |

FOREIGN PATENT DOCUMENTS

| | | |
|---|---|---|
| 1468489 | 3/1977 | United Kingdom . |
| 1534227 | 11/1978 | United Kingdom . |

Primary Examiner—Joseph F. Peters, Jr.
Assistant Examiner—Donn McGiehan

[57] ABSTRACT

Apparatus for use on a vehicle having a main drive shaft and first and second output shafts operable for providing driving torque to the wheels of the vehicle. The apparatus comprises electromagnetic sensors for determining excessive difference in output speeds of the first and second output shafts to detect a slip condition and a control circuit operable to actuate another mechanism for eliminating the slip condition in response to the sensing means. The other mechanism is operable for a predetermined time after actuation thereof.

22 Claims, 8 Drawing Figures

VEHICLE DRIVE CONTROL SYSTEM

This application is a continuation of application Ser. No. 114,523, filed Jan. 23, 1980 now abandoned.

BACKGROUND OF THE INVENTION

1. Field of the Invention

The invention is in the field of control circuits for vehicle drive systems and is particularly applicable for vehicles having a differential mechanism dividing torque between two output shafts.

2. Description of the Prior Art

Various mechanisms have been devised in the automobile and trucking industry to control excessive slippage between the driving wheels of a vehicle. Such devices usually serve to equalize the rotational speed of two or more output shafts which are driven by a main drive or input shaft. The driven shafts may practically be referred to as output drive shafts since they are used to drive vehicle wheels either directly or through some intermediate mechanical linkage. Some differential in speed between these shafts is necessary to permit different rotational speeds of the driving wheels as the vehicle negotiates a turn, encounters bumps or holes in the roadway, or traverses rough terrain. Most typically, the output drive shafts are coupled by means of a differential to a main drive shaft or propeller shaft, and the differential provides the mechanism for dividing torque evenly between the output drive shafts and allowing for different rotational speeds in the output drive shafts. In the trucking industry, it is also advantageous to provide multi-axle tandem drive assemblies utilizing an inter-axle differential coupling the main propeller shaft from the engine to the differentials on each of the two rear driving axles hereafter referred to as the forward rear and rear rear drive axles.

Under normal operating conditions, when the vehicle is traveling on good roads and under dry whether conditions, excessive slip between output drive shafts is usually not encountered and no corrective actions are required. However, during adverse weather conditions the vehicle may be traveling through mud or ice and an exceptional amount of slippage may occur as when one of the wheels loses traction and begins to spin excessively, hereafter referred to as a "slip condition". It has therefore been advantageous to provide lockout mechanisms or other control devices to eliminate the excessive difference in rotational speeds of the differential output shafts.

Mechanical lockout mechanisms for coupling the main drive shaft to an output shaft of a differential have been utilized in the trucking industry and examples are shown in U.S. Pat. Nos. 3,264,901 and 3,390,593. Mechanical locking devices have also been utilized on inter-axle differentials of tandem drive roadway vehicles as illustrated in U.S. Pat. No. 2,870,853.

A ratio sensitive electronic control for limited slip differentials is disclosed in U.S. Pat. No. 3,138,970.

An exemplary teaching of an electromechanical system utilizing selective brake control to limit the speed differential between a pair of wheels of a vehicle is shown in U.S. Pat. No. 3,706,351.

Generally speaking, in a differential mechanism, by locking any two shafts of the group of three shafts consisting of the input drive shaft and the two output drive shafts one locks all three shafts and eliminates the "differential" function. The terms "lock-out," "lock condition" or "locked condition" generally refer to the condition wherein the differential mechanism coupling the main drive shaft to the two output shafts is rendered inoperable with the result that both output shafts rotate at the same speed, and torque delivered from the engine is provided to both output shafts as required by the external resistance each output shaft is subject to.

Lock-out may typically be achieved manually by the vehicle driver upon sensing a slip condition or may be achieved under automatic control as for example, in U.S. Pat. No. 3,138,970 mentioned above. Slip control may also be provided by means other than locking out a vehicle differential, and the brake control system of U.S. Pat. No. 3,706,351 constitutes an alternate approach to the problem. Electronic circuitry may thus be provided to control means for eliminating or at least decreasing the amount of slip to within acceptable limits.

Typically, the electronic control is responsive to sensed input speed signals and provides continuous monitoring and control. Such continuous monitoring systems are susceptible to repeated cycling of the control apparatus inasmuch as output shaft speeds tend to become synchronous almost immediately after lock-out thereby destroying the error signal before the vehicle is actually out of its slip condition. The electronic control continues to monitor the output shaft speeds and if indeed the vehicle is not out of its initial slip condition upon release of the locking device the error signal will be regenerated and the control locking device reapplied. Oscillations may typically occur within the drive system at a rather high frequency of between 1-3 Hz. Such oscillations may adversely affect the vehicle by repeatedly stressing the drive train components and may disturb the vehicle operator, particularly if the control system continues to recycle and the vehicle fails to traverse that portion of the road presenting the "slip" condition.

SUMMARY OF THE INVENTION

It is an object of the invention to eliminate the disadvantages of the prior art by providing a slip control apparatus which is not susceptible to rapid cycling, but which rather maintains the "locked" condition for a predetermined set time.

Another object of the invention is to provide a control apparatus particularly useful in coupling mechanisms of the differential type for providing an extended and fixed locking time interval after excessive difference in output speeds. Typically the fixed locking time interval is greater than 20 seconds and may be as great as several minutes depending upon the type of vehicle and its application.

Yet another object of the invention is to provide a lock-out mechanism having an extended lock-out operating time after actuation for use on inter-axle differentials of a tandem drive vehicle.

Another object of the invention is to provide a fail-safe indicating circuitry for a slip control apparatus to ensure disabling of the lock-out control if a true locked condition is not sensed after a given interval of time. The utilization of the failsafe circuitry permits verification of operation of the mechanical lock apparatus and sensor functions.

Yet another object of the invention is to provide a self-testing slip control circuit for vehicles which automatically tests operation of the slip control circuitry upon power-up of the vehicle.

A further object of the invention is to provide a slip control lockout device which includes a brake override circuit to inhibit further lockout commands during braking of the vehicle.

In accordance with the principles of the invention there is provided an apparatus for use on a vehicle having a main drive shaft and first and second output shafts operable for providing driving torque to the wheels of a vehicle. The apparatus comprises means for sensing the relative rotational speed of the first and second output shafts to detect a slip condition and control means responsive to said sensing means and actuable for eliminating excessive slip speed differential between said output shafts. In the preferred embodiment, the control means is actuable in a differential mechanism for rotatably locking together two of the aforesaid groups of shafts in response to the sensing means. The control means is operable for a predetermined time after actuation thereof. The invention is particularly applicable to tandem drive vehicles utilizing an inter-axle differential having means such as a fork and yoke assembly for sliding a clutch collar into engagement for locking the main input shaft of the inter-axle differential to one of the output shafts of the inter-axle differential or for locking both output shafts together.

BRIEF DESCRIPTION OF THE DRAWINGS

These and other objects of the invention will become clear in connection with the following specification wherein.

DESCRIPTION OF THE PREFERRED EMBODIMENT

Figure 1:
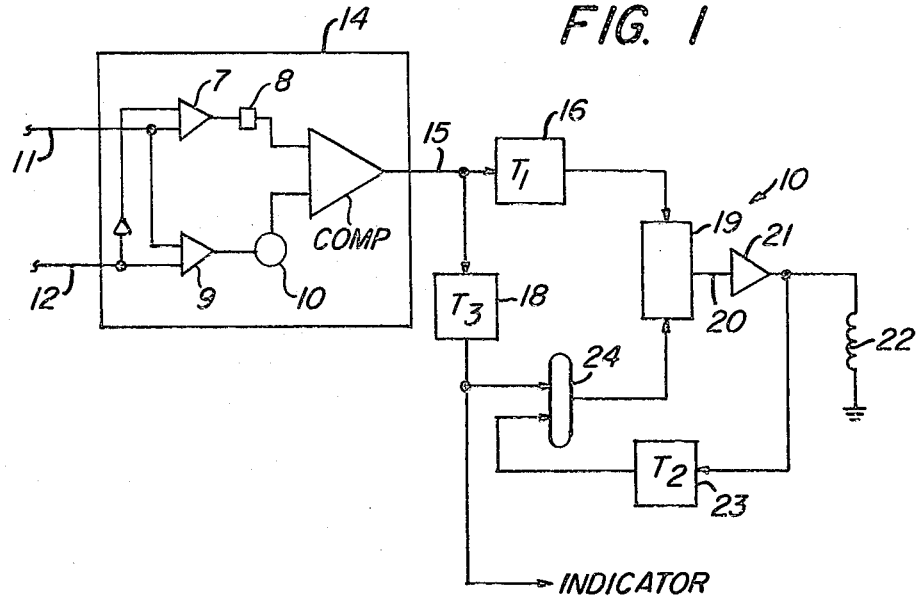
FIG. 1 is a block diagram illustrating the principles of the electronic control circuitry in accordance with the invention.

FIG. 1 is a block diagram depicting a slip control circuitry in accordance with the invention. The control means generally indicated at 10 is connected to receive electrical signals from two sensors (not shown) which detect the rotational speed of any two of the output drive shafts. Typically, one sensor may be positioned to detect the rotational speed of the main drive (input) shaft at the input to a differential, and a second sensor may be positioned to detect the rotational speed of an output shaft coming from the differential. The sensors themselves may be of conventional design such as magnetic sensors which provide an output pulse upon passage of each tooth of a gear or rotor secured to the drive shaft. As such, the frequency of the incoming signals is proportional to the speed of rotation of the shaft. The sensed signals $W_1$ and $W_2$ are provided along input lines 11 and 12 to a differential circuit 14 which measures the difference between the two signal frequencies. The differential circuit 14 may typically comprise a comparator (COMP) for comparing the difference 8 between the absolute values of the two input signals as monitored by adder 7 where the absolute values are proportional to their respective input frequencies with a reference value. The reference value may itself be generated by summing the two input signals by adder 9 and multiplying at 10 by a reference value (0.05 for example) appropriate for the type of comparator utilized. The differential circuit 14 thus provides an output signal along line 15 only if the differential in rotational shaft speed is greater than a predetermined allowable slippage level. Some slippage is obviously acceptable due to normal operating conditions of the vehicle as for example to permit travel during turns and along uneven terrain and to accommodate different tire radii.

The output signal along line 15 may be termed an error signal or DIFF signal indicating an excessive differential in the rotational speed of the shafts. The DIFF signal is fed to two timers, T1, shown at 16 and T3 shown at 18. Timer T1 provides an output pulse after a nominal turn on delay on the order of 0.25-0.5 seconds and is provided to minimize "false" actuation in the presence of incipient wheel slip. After this turn on delay, T1, the output of timer 16 is fed to the set input of a RS flip-flop 19 which subsequently provides an output pulse at the Q output thereof. The output pulse is fed via a line 20 to power amplifier 21 which subsequently drives a control device or solenoid 22.

The control device 22 is utilized to actuate means for eliminating the slip condition detected by the sensor inputs. A solenoid employed as the control device 22 may be utilized to shift a clutch collar and thereby place a differential mechanism in a "locked condition." Such an application will hereafter be described in greater detail. The control device 22 may also be utilized in combination with a selective brake control system similar to that disclosed in U.S. Pat. No. 3,706,351 or in a four-wheel drive vehicle of the type disclosed in U.S. Pat. No. 3,557,634 to engage a clutch and thereby provide driving torque the forward drive axle of such a vehicle.

The driving signal from power amplifier 21 also is fed to a timer T2 indicated as 23. Timer T2 is the basic cycle timer and provides a predetermined time interval, typically on the order of 30-60 seconds, during which the control device 22 remains actuated. At the end of this predetermined time interval, T2 provides an output signal to OR gate 24 which subsequently provides an output to the reset terminal of flip-flop 19. Upon reset, the Q output of flip-flop 9 goes low thus releasing the control device 22. The reset of flip-flop 19 may also occur after timer T3, the failsafe timer times out since the output of 18 is also fed to an input or OR gate 24. Failsafe timer T3 is typically set to be greater than the time interval T1 and less than a time interval T2. The purpose of the fail-safe timer is to release the control device 22 in the event the slip condition has not been eliminated after the time interval T3. For example, the time interval T2 may be set for 30 seconds, and the time interval t3 may be set for 15 seconds. If the DIFF signal on line 15 is still present at the end of 15 seconds, the failsafe timer t3 resets the flip-flop 19 thus releasing the control device 22. The failsafe timer operates on the premise that the previously sensed slip condition should have been eliminated after the time interval t3 so that the DIFF signal along line 15 should no longer be present. If the DIFF signal is still present, then it is assumed that some malfunction may have occurred, for example a sensor failure or failure of the lock-out mechanism. In either event, it is desirable to release the control device and provide an indication to the operator of the failsafe condiion. The time interval T3 may be set anywhere within the window defined by T1 and T2. For example, one may have the time interval T2 at 30.5 seconds with the timer T3 at 30.0 seconds. Such a situation enables a very narrow window for the timer T3 (from 30.0 to 30.5 seconds) and thus may be utilized to eliminate detection of spurious DIFF signals due to heavy gear vibrations and the like.

Figure 2:
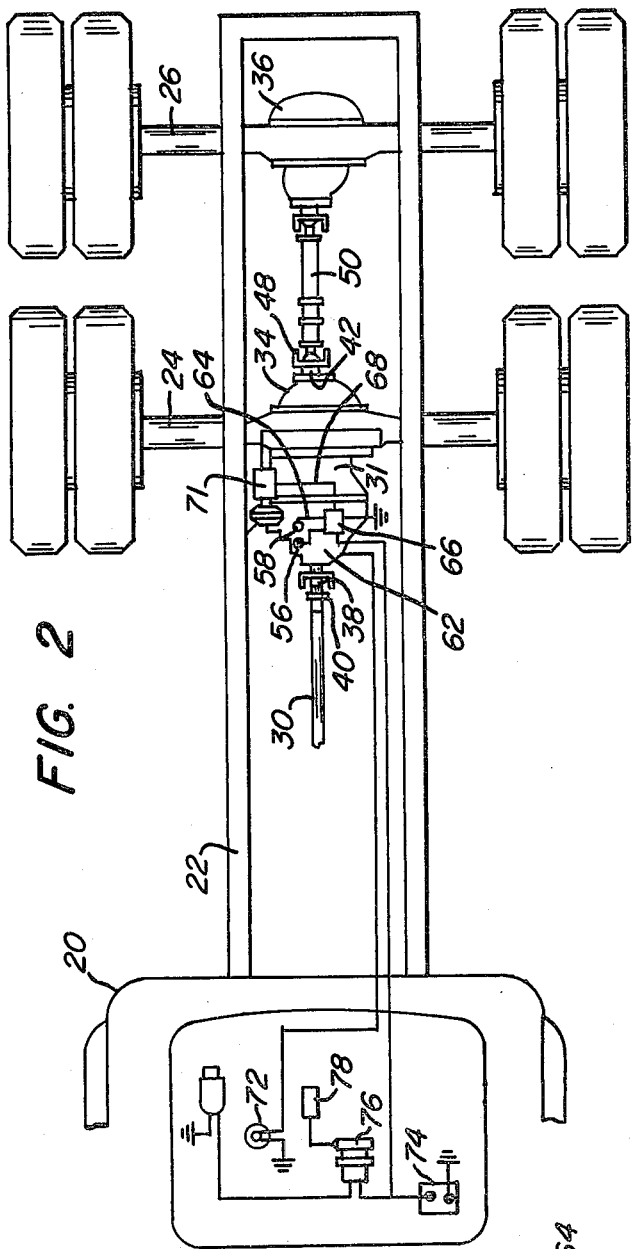
FIG. 2 is a top plan view of a truck cab and carrier utilizing an inter-axle differential in accordance with the principles of the invention.

The preferred embodiment of the invention as utilized in an inter-axle differential of a tandem drive vehicle is shown in FIGS. 2-5. FIG. 2 shows a top plan view of a truck cab 20 and a carrier 22. The carrier 22 is supported by a tandem drive rear end having a forward rear axle 24 and a rear rear axle 26.

Figure 3:
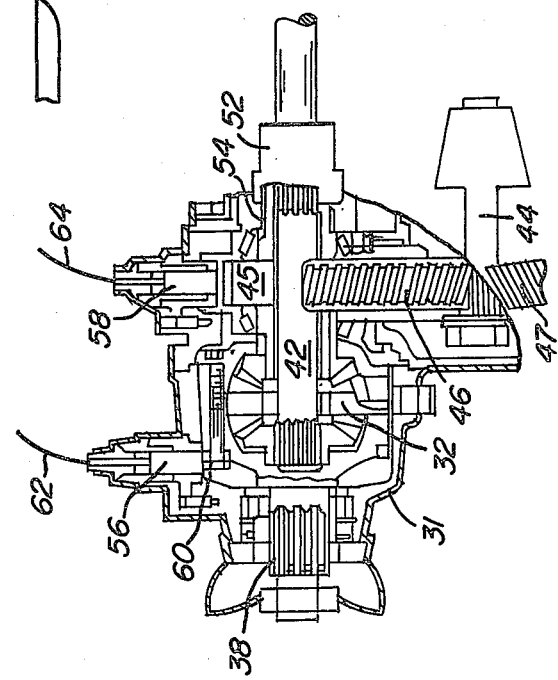
FIG. 3 is an enlarged view showing portions of the inter-axle differential of FIG. 1.

Torque from the vehicle engine is transmitted by the main drive or propeller shaft 30 to an inter-axle differential 32 supported within a housing 31 which divides that torque between the forward rear differential 34 and the rear rear differential 36. The prop shaft 30 is connected to the inter-axle differential input 38 by a universal joint 40. The inter-axle differential 32 divides the torque provided to input 38 between a first output or through shaft 42 and a second output shaft 44. With reference to FIG. 3, the output shaft 42 is driven directly by the left side gear of the differential 32 and the output shaft 44 is driven by a series of "drop" gears 45–47 which in turn are driven by the right side gear of the differential 32. Output shaft 44 rotates a pinion gear which drives the ring gear of the forward rear differential 34. Output shaft 42 is connected by a universal joint 48 to a propeller shaft 50 which in turn drives the ring gear of the rear rear differential 36.

A collar 52 is splined to output shaft 42. The collar 52 is axially movable relative to the shaft 42 by a fork (not sown) and may be moved to the left as shown in FIG. 3 into engagement with teeth 54 provided to the hub of drop gear 45. When the collar 52 is engaged with teeth 54, the drop gear 45 and the output shaft 42 are mechanically locked together and rotate at the same speed. The differential 32 is precluded from changing the equal division of speed until the collar 52 is disengaged from the teeth 54.

A representative tandem axle assembly including an inter-axle differential and a lock-out mechanism is shown in U.S. Pat. No. 2,870,853 as well as in Rockwell SFHD, STHD, SUHD Parts Book, Publication No. SP-7646-1 published by Rockwell International Corporation, Troy, Mich. The foregoing references are incoporated herein by reference.

Two sensors 56 and 58 are carried by the differential housing 31. Sensor 58 is responsive to rotary movement of the teeth of gear 45 and thereby senses the rotational speed of output shaft 42. Sensor 56 is responsive to rotary movement of a toothed rotor 60 carried by the casing of differential 32 and thereby senses the rotational speed of the main drive shaft 30. Sensors 56 and 58 provide output signals along lines 62 and 64 to the control means or controller 66 located on the housing 31 of inter-axle differential 32. Upon sensing a speed differential in response to the signals along the input signal lines 62 and 64, the control means 66 provides an output signal along line 68 to air solenoid valve 70 which operates in a conventional fashion to move collar 52 and lock-out the inter-axle differential 32. Upon actuation of a lock-out condition, control means 66 provides a signal to indicator light 72 which is visible to the driver of the vehicle.

Control means 66 is powered by the brake light circuit and includes means to disable the lock-out mechanism upon operation of the vehicle brakes. FIG. 2 shows a battery indicated at 74 connected to a stop light switch 76 closed in response to operation of treadle valve 78. The inter-connection of the control means 66 to the brake light circuitry also enables detection of an open line condition. In this case, the open brake circuit would be detected by the control means 66 which would disable the lock-out operation.

Figure 4:
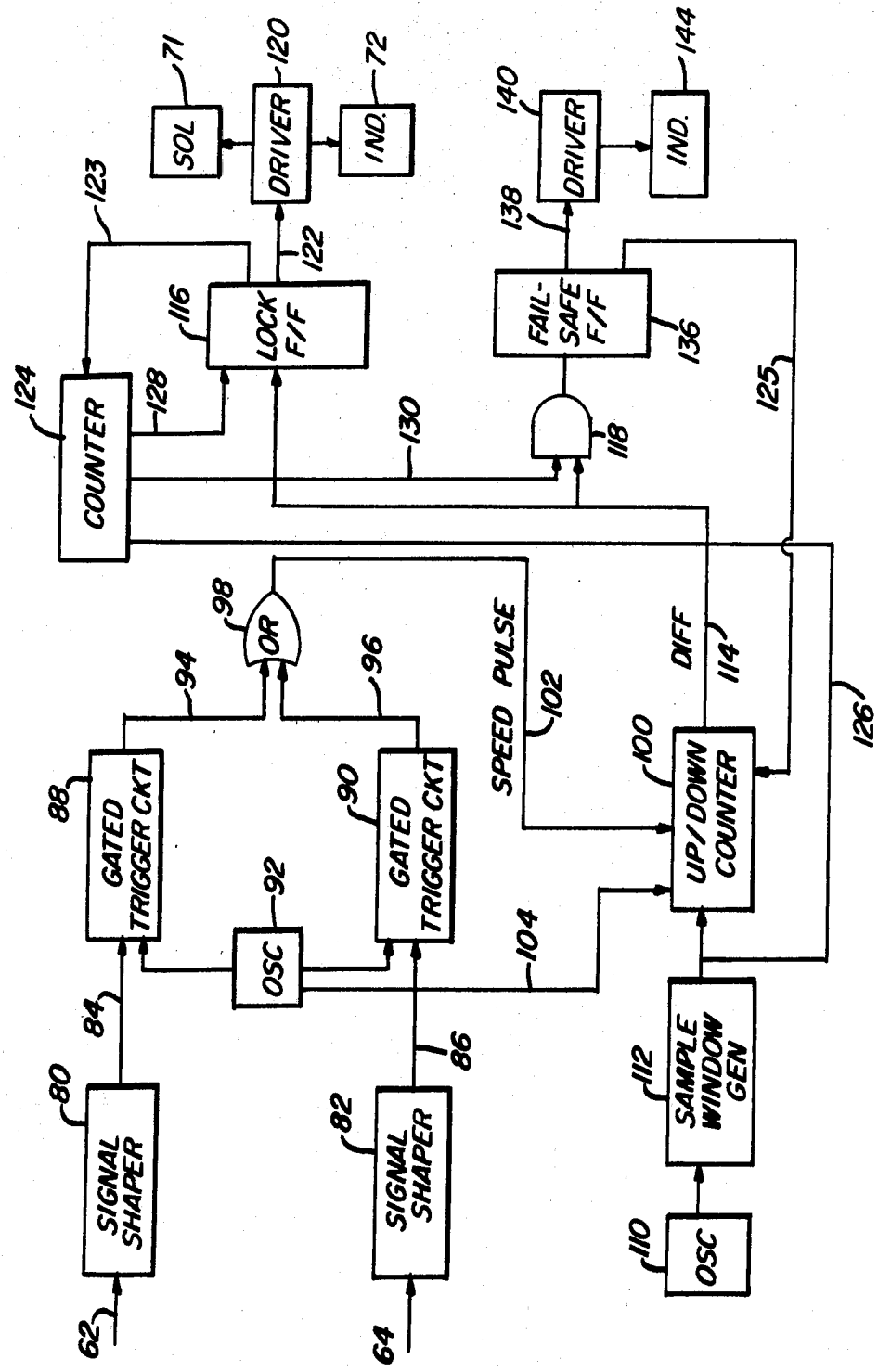
FIG. 4 is a block diagram of a preferred embodiment of the control circuitry in accordance with the principles of the invention.

FIG. 4 is a block diagram showing the main components of the control means 66. Input signals from sensors 56 and 58 are fed along the input lines 62 and 64 to respective signal shaping circuits 80 and 82. The signal shaping circuits 80 and 82 effectively convert the sinusoidal input signals to square wave forms which are subsequently fed along lines 84 and 86 to gated trigger circuits 88 and 90. The gated trigger circuits 88 and 90 are alternately gated by means of an oscillator 92 so that either a pulse is provided along an output line 94 or 96. Lines 94 and 96 are connected to inputs of OR gate 98 whose oiutput is connected to an up/down counter 100 via a line 102. The signal along line 102 is indicative of the speed pulse from either one or the other sensors, and the frequency of the pulse is direcly proportional to the rotational speed as of the shafts 30 and 42 measured by the sensors 56 and 58. Oscillator 92 also provides a signal along line 104 to the up/down counter 100 so that the signal along line 102 can be correlated as coming either from the gated trigger circuit 88 or gated trigger circuit 90. One gated trigger circuit is utilized to provide up counts in the up/down counter 100 while the other gated trigger circuit provides the down counts. The signals along line 104 from oscillator 92 essentially enable operation of the counter 100 in either the "up" mode or the "down" mode depending upon which of the particular signal sensors is being counted. Up/down counter 100 is preset as, for example, to the binary value 4. Counting down on up/down counter 100 indicates that one sensor, for example sensor 56, is providing more signals per unit time than the other sensor, as for example sensor 58. Counting up on the up/down counter 100 indicates the reverse condition. The count up and count down time window is provided by means of an oscillator 110 and sample window generator 112. Typically, the window time frame may be on the order of 200 milliseconds. The up/down counter 100 is preset with the binary value 4. If a zero count is reached within the sampling time window, an output signal, DIFF, is provided along line 114 at the output of up/down counter 100. Similarly, if a binary 8 is reached within the sampling time window on the up/down counter 100 a DIFF signal is similarly generated along line 114. The DIFF output signal is fed to a lock flip-flop (F/F) 116 and to one input of a NAND gate 118. The DIFF signal serves to set the lock flip-flop 116 so that a signal is provided along the Q output thereof to a driver circuit 120 along line 122. The output of driver circuitry 120 feeds a solenoid 71 which drives the collar 52 of the inter-axle differential to lock-out the differential 32. Driver circuitry 120 also provides a visual indication to the vehicle operator by means of energizing indicator lamp 72.

Lock flip-flop 116 is reset upon receipt of the reset pulse from a counter 124 at the passage of a predetermined time preset in counter 124 and started upon generation of the DIFF signal. The counter is thus enabled and begins to count upon receipt of a count enable signal from lock flip-flop 116 along a line 123. The reset signal from counter 124 is provided to the lock flip-flop 116 along a line 128. The reset signal along line 128 will occur 435 seconds after generation of the DIFF signal along line 114 in the embodiment described. The control circuit may of course be modified to provide fixed time intervals of different durations, preferably greater than about 20 seconds for other embodiments of the invention. A second output from the counter 124 is provided along a line 130 to the second input of NAND gate 118. This second output corresponds to the failsafe timer T3 of FIG. 1. Again, the count enable signal along line 126 is utilized to provide the count starting reference for enabling counter 124.

The output of NAND gate 118 is utilized to set a failsafe flip-flop 136 provided that the DIFF signal along line 114 is present at the same time the output of counter 124 provides a signal on line 130. This condition effectively requires that the DIFF signal be present at the time T3 utilizing the nomenclature of FIG. 1. Upon setting of the failsafe timer 136, a signal is provided along a line 138 to a driver circuit 140 which in turn energizes a failsafe indicator 144. An output of failsafe F/F 136 along line 125 to the up/down counter 100 also serves to shut down or disable the control apparatus so that no further operation of driver circuit 120 is possible.

FIGS. 5A, 5B, 5C and 5D are schematic circuit diagrams showing the details of the block diagram of FIG. 4. Signal shaping circuits 80 and 82 are identical and only one circuit will thus be described. Signal shaping circuit 80 comprises a voltage comparator 180, zener diode D1, and filter networks provided by resistors R1, C15 and R2, C16 and C4. Resistors R5 and R9 form a voltage divider and provide a reference voltage to one input of the voltage comparator 180 with the other input fed by the signal from the sensors. Conventional sensors may be utilized such as the variable reluctance magnetic pickup-type which provides a sinusoidal input to the shaping circuit 80. The output of comparator 180 is effectively a squarewave and is fed to gated trigger circuit 88. For ease of description, it will be assumed that the output of voltage comparator 180 is fed directly to the input of the gated trigger circuit 88 and the three NAND gates (elements 380, 382 and 384) therebetween will be explained below. Gated trigger circuit 88 comprises a D flip-flop 190 which is set upon receipt of the output signal from voltage comparator 180 and provides at its output a high logic signal in response thereto. The Q output of flip-flop 190 is fed to one input of a four input AND gate 192 whose other three inputs are provided by a counter output to be described hereinafter. The gated trigger circuit 88 further comprises a buffer/inverter driver 194 which feeds a logic NAND gate 196. The output from NAND gate 196 is a positive pulse of about 20 microseconds width and is fed to the output line 94 from the gated trigger circuit 88. A similar 20 microsecond pulse is provided along the output line 96 of the gated trigger circuit 90. Lines 94 and 96 are fed to OR gate 99 which is fabricated from a NOR gate 200 connected to an inverter 202. The output of OR gate 99 is fed to the up/down counter 100 which may, for example, be of a presettable binary type.

Oscillator 92 may comprise a sampling oscillator 210 coupled to a four bit binary counter 212. Counter 212 provides an output code along lines 214a, b, c and d. Output lines 214a–c provide binary codes identified as A, B̄ and C̄ respectively. Codes A, B̄, C provide condition code inputs to AND gate 192 of the gated trigger circuit 88. Likewise, condition codes A, B, C̄ provide inputs to the corresponding AND gate of gated trigger circuit 90. The different condition codes insure that only one of the gated trigger circuits 88 and 90 will be triggered at any given time. Oscillator 210 may typically be a 40 KHz oscillator and the sampling rate provided by the four bit counter to each of the gated trigger circuits 88 and 90 as typically on the order of 5 KHz. The sampling time is chosen to be much larger than even the fastest expected sensor rate which is in the range of 0–1 KHz.

The four bit binary counter 212 provides an output along line 104 to the up/down control input of the up/down counter 100. Consequently, up/down counter 100 will count either in the up or down direction depending upon the state of the control input along line 104 which continually alternates from one state to the other in synchronism with the gating of the gated trigger circuits 88 and 90.

Figure 5B:
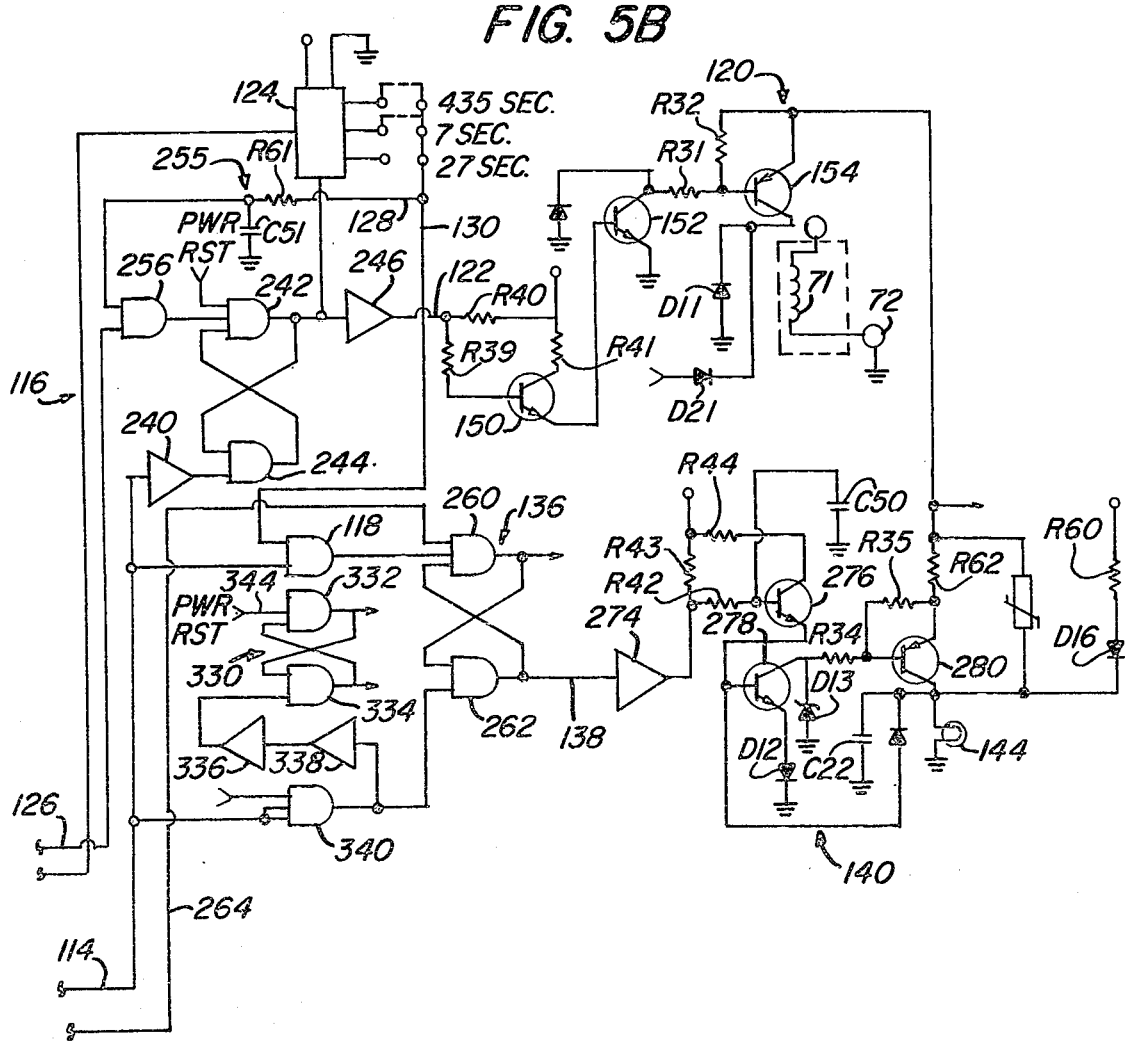
FIGS. 5A, 5B, 5C and 5D are schematic diagrams detailing the circuitry of the preferred circuit embodiment of FIG. 4.
Figures 5A, 5C, 5D:
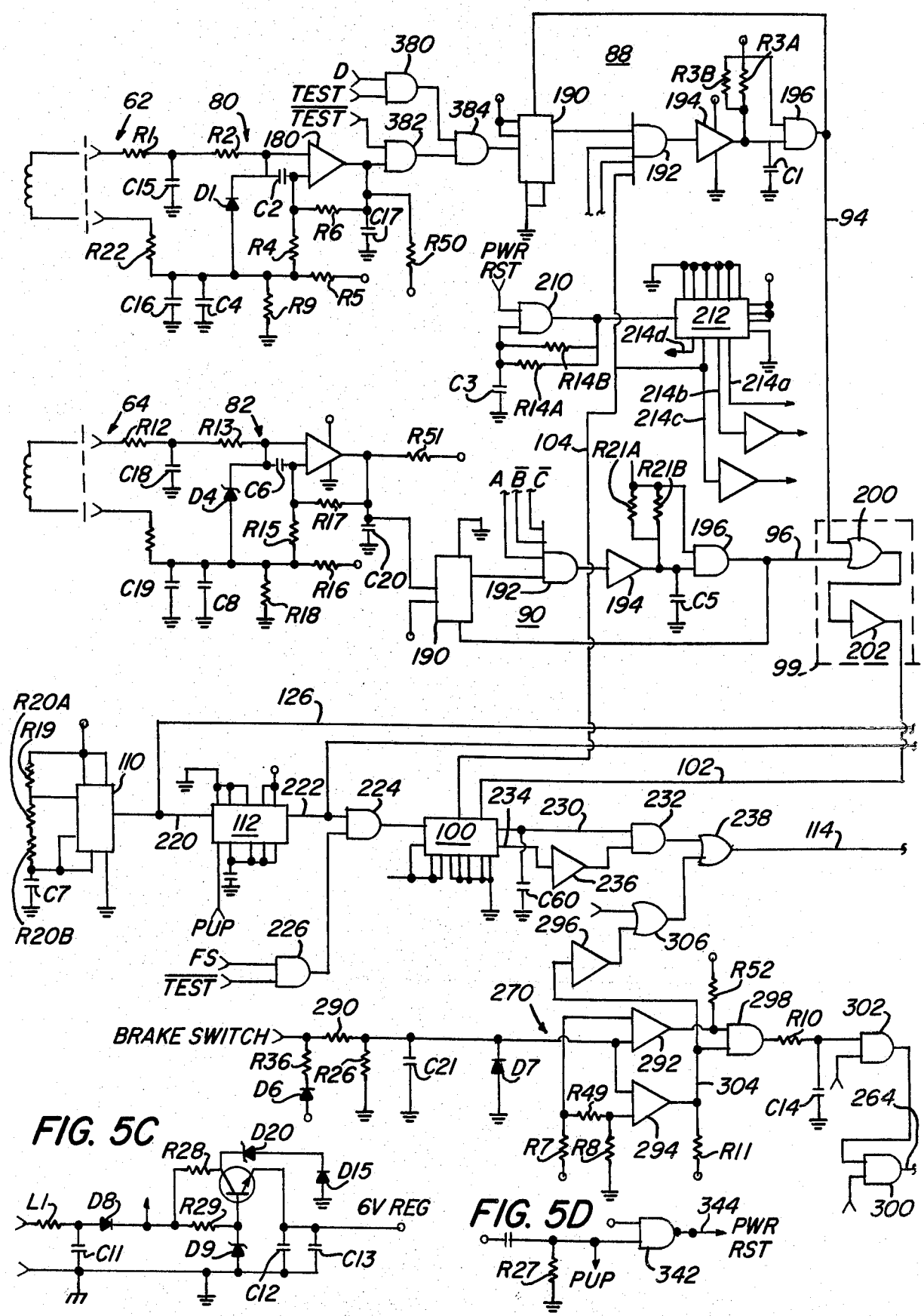

Also shown in FIG. 5A are the oscillator 110 and sample window generator 112. Oscillator 110 provides a pulse having a period of 13.3 ms at its output terminal. This pulse is fed to the sample window generator 112 along line 220. Sample generator 112 may comprise a divider circuit and is configured to divide the incoming signals by 16 thereby providing a nominal 200 ms output signal along a line 222 feeding one input of NAND gate 224. The other input of NAND gate 224 is conditioned by the output of NAND gate 226. The output signal of NAND gate 224 is fed to the up/down counter 100 and presets the counter to the binary 4 state every 200 ms. Consequently, the up/down counter 100 has a window for receiving speed pulses along line 102 for a period of 200 ms before being reset to the preset binary 4 value. During this 200 ms window, the up/down counter 100 may either count down to the value zero or count up to the value 8 depending upon the difference in frequency of the pulses from the input sensor lines 62 and 64. If a binary 8 count is reached an output pulse is provided along a line 230 from the up/down counter 100 to one input of AND gates 232. If a 0 count is reached, the output of up/down counter 100 is fed along a line 234 via inverter 236 to the second input of AND gate 232. The output of AND gate 232 is connected to NOR gate 238, which provides an output DIFF signal along line 114. The DIFF signal is high (logical 1) whenever the output of the up/down counter 100 reaches either the binary count 8 or the binary count 0 thereby indicating a significant difference in rotational speed of the two measured shafts. The high DIFF signal along line 114 is fed to the lock flip-flop 116 via an inverter 240. Lock flip-flop 116 comprises cross connected NAND gates 242 and 244, the output of NAND gate 242 being fed to inverter/driver 246. The output of inverter/driver 246 is fed along a line 122 to the driver circuitry 120 consisting of transistors 150, 152 and 154. A solenoid 71 is powered by the drive circuit 120 as well as the indicator 72 indicating a locked condition.

The output of NAND gate 242 is also fed to the count enable terminal of counter 124. Counter 124 may be preset for a period predetermined time or a fixed time interval of 7, 27 or 435 seconds and after expiration of the fixed time interval supplies a clock signal along lines 128 and 130 respectively. Counter 124 is set for a fixed time interval of 435 seconds in the embodiment described herein. Line 128 includes an RC time constant 255 which provides a time delay of about one-half second. The signal along line 128 goes high at the end of the preset time interval as, for example, 435 sedonds during which the lock condition is maintained. During the preset time interval the lock condition will be maintained regardless of the value of the DIFF signal on line 114 since the flip-flop 116 remains locked until reset by the delayed time interval signal along line 128. To this end, the timing signal along line 128, delayed for one-half second by time delay 255, is connected to one input of NAND gate 256 which has its output feeding an input of NAND gate 242. The second input of NAND gate 256 is provided by a clock signal along line 126 coming from oscillator 110. NAND gate 256 is utilized to prevent any race condition of the lock flip-flop 116. The output of NAND gate 256 is driven low upon the simultaneous occurrence of the clock pulse along line 126 and the delayed time signal derived from line 198. The low output of NAND gate 256 drives NAND gate 242 high which forces the inverter/driver 246 low thus turning off solenoid 71 and indicator 72. Simultaneously, the high output of NAND gate 242 resets the counter 124.

The timing signal along line 130 is the same signal as the signal along line 128 but is not subject to delay. The timing signal along line 130 is fed to NAND gate 118 and thence to failsafe flip-flop 136 consisting of two cross connected NAND gates 260 and 262. NAND gate 260 also receives a signal along line 264 from a brake circuit 270 to be described hereinafter. The output of NAND gate 260 supplies a signal termed the FS or failsafe signal which is normally low when inoperative and goes to a high (logical 1) state during a failsafe mode in which the circuitry is to be shut down. For example, if the DIFF signal along line 114 is still present, (high, logical 1) at the time the timing signal is generated along line 130 (one-half second before the delayed signal on line 128), the output of NAND gate 260 will go low generating a logical 0 FS signal. Simultaneously, the output of NAND gate 262 is driven low so that $\overline{FS}$ goes low (logical 0).

The FS signal from NAND gate 260 is fed to an input of NAND 226 (FIG. 5A). Gate 226 in turn emits a signal to NAND gate 224 which continually presets up/down counter 100 and thereby disables operation of the control circuit. The signal from gate 262 provides a low output along line 138 to inverter/driver 274. The output of inverter/driver 274 feeds the driver circuit 140 which consists of transistors 276, 278 and 280 similar to the driver circuit 120. A failsafe indicator 144 is energized when the system is operating in the failsafe mode.

An additional feature shown in FIGS. 5A and 5B is the incorporation of the brake circuit 270 into the apparatus of FIG. 4. Brake circuit 270 detects both the brake on condition and an open circuit condition which may result, for example, from filament burn out or wire disconnections. Line 290 is connected to the brake circuit with the vehicle battery and brake lamps. With brakes applied the voltage on line 290 is normally approximately 13.6 volts. Brake circuit 270 comprises resistors R25, R36, R26, capacitor C21 and diodes as shown. Further, voltage comparators 292 and 294 are provided as well as inverter 296, AND gates 298 and 300 and NAND gate 302. Resistors R7, R49 and R8 form a voltage divider feeding one input of voltage comparator 294 which has its other input connected to line 290 via resistor R25. If the brake switch is actuated, voltage comparator 294 is driven high at its output at line 304 which feeds inverter 296 driving same to the low state. Inverter 296 is connected to NOR gate 306 which subsequently forces the output of line 114 low (logical 0) via the NOR gate 238. As such, by maintaining DIFF low during actuation of the brake switch, the lock out circuitry is prevented from being operated. Inhibition of lock-out during braking is desirable to prevent inter-axle differential lock up resulting from non-synchronous wheel rotation during braking.

Brake circuit 270 further permits detection of an open brake circuit by means of voltage comparator 292 which is held low upon an open brake circuit condition and normally receives a voltage between one-third and two-thirds of the regulated power supply voltage resulting from the biasing network of resistors R36, R25 and R26. During an open brake circuit condition, the logical output of voltage comparator 292 and voltage comparator 294 is fed to AND gate 298, which subsequently feeds NAND gate 302 which in turn feeds AND gate 300. An output along line 264 is provided to an input of NAND gate 260 of the failsafe flip-flop 136 setting same thereby generating a high failsafe signal (logical 1). The FS signal continually presets the up/down counter 100 via NAND gate 226 as heretofore described thus prohibiting further generation of the DIFF signal along line 114.

Although both a brake applied or brake switch closed condition and an open or floating connection to the stoplight circuit are effective to prevent operation of the solenoid driver circuit 120, the open circuit condition activates the failsafe flip-flop 136 which remains activated until manually reset whereas the brake applied condition merely temporarily inhibits generation of any DIFF signals along line 114 via the NOR gate 238. In the latter case, once the brake lights are turned off, the control circuit becomes effective to operate the solenoid driver circuit 120.

Yet an additional feature shown in the circuitry of FIGS. 5A–D is a power up self-test circuit 330 consisting of cross connected NAND gates 332, 334, inverters 336 and 338 and NAND gate 340. The power up self-test circuit further comprises capacitor C10, resistor R27 and NAND gate 342 FIG. 5D. The voltage regulator shown in FIG. 5C provides a regulated output voltage, V, of approximately 6 volts. During startup the 6 volt pulse provides a PUP (power up signal) held for approximately 2 seconds by means of RC time constant provided by resistor R27 and capacitor C10. The power up signal insures a logical 0 signal at the output of NAND gate 342 which is fed via a line 344 to NAND gate 332. This signal provides a means for testing the circuitry upon a power up sequence by providing TEST and $\overline{TEST}$ signals which simulate a sensor input by providing simulated counts utilizing NAND gates 380 and 382. A D coded signal is also provided by the four bit binary counter 212 which is fed to one input of NAND gate 380. Consequently, after the vehicle ignition is turned on and the voltage regulator stabilizes, pulses are provided at the output of NAND gate 384 which feeds the D flip-flop 190 generating simulated counts which are sampled by means of the sampling oscillator 210 and binary counter 212. The gated trigger circuit 90 does not, however, receive any simulated counts and therefore a DIFF signal is generated along line 114. The DIFF signal is fed to NAND gate 340 along with the TEST signal which resets the power up self-test flip-flop 330 (set by the PWR RST signal) and likewise resets the failsafe flip-flop 136. The failsafe indicator 144 will nevertheless be energized for approximately 2 seconds which is the time frame during which the power restart (PWR RST) signal is present. After the PWR RST signal goes to 0 the failsafe indicator will no longer be energized unless a malfunction is detected in the circuitry. The output of NAND gate 342 also serves as a power reset (PWR RST) and is utilized with the PUP signal as a signal to NAND gates 210, 242, 332 and 300 to reset the counters and flip-flops associated with those NAND gates. Thus, power up sequence provides initialization of the system as well as positive indication that the failsafe indicator and the electronic components of the control circuit are working properly.

Integrated circuit components which may be utilized in the circuitry shown in FIGS. 5A and 5B are set forth by way of example in the following table:

| Reference Nos. | Part No. |
|---|---|
| 82, 180, 292, 294 | LM 2901 |
| 190 | CD 4013 |
| 196, 210 | CD 4093 |
| 192 | CD 4082 |
| 194 | CD 4007 |
| 100, 112, 212 | F 4029 |
| 202, 236, 336, 338, 240, 246, 274, 296 | CD 4049 |
| 110 | LM 555 |
| 242, 260, 340 | CD 4023 |
| 118, 224, 226, 244, 256, 262, 302, 332, 334, 380, 382, 384 | CD 4011 |
| 124 | CD 4040 |
| 200, 238, 306 | CD 4001 |
| 232, 298, 300 | CD 4081 |

Representative values of the circuit components utilized in FIGS. 5A and 5B are set forth by way of illustration and example in the following table:

TABLE

| Element | Value | Element | Value |
|---|---|---|---|
| R1 | 10K | R22 | 470 |
| R2 | 10K | R23 | 470 |
| R3a | * | R25 | 1.8K |
| R3b | * | R26 | 10K |
| R4 | 10K | R27 | 68K |
| R5 | 1.5K | R28 | 20 |
| R6 | 160K | R29 | 300 |
| R7 | 4.7K | R31 | 150 |
| R8 | 4.7K | R32 | 220 |
| R9 | 1.5K | R34 | 180 |
| R10 | 27K | R35 | 220 |
| R11 | 10K | R36 | 7.5K |
| R12 | 10K | R39 | 8.2K |
| R13 | 10K | R40 | 4.7K |
| R14a | * | R41 | 1K |
| R14b | * | | |
| R15 | 10K | R42 | 8.2K |
| R16 | 1.5K | R43 | 4.7K |
| R17 | 160K | R44 | 1K |
| R18 | 1.5K | R49 | 4.7K |
| R19 | 10K | R50 | 3K |
| R20a | * | R51 | 3K |
| R20b | * | R52 | 10K |
| R21a | * | R60 | 47 |
| R21b | * | R61 | 150K |
| R62 | 6.2 | D20 | MZP4746 |
| C1 | 150pf | D21 | 1N5395 |
| C2 | .01uf | L1 | 2.2uh |
| C3 | 150pf | | |
| C4 | 10uf | | |
| C5 | 150pf | | |
| C6 | .01uf | | |
| C7 | .047 | | |

TABLE-continued

| Element | Value | Element | Value |
|---|---|---|---|
| C8 | 10uf | | |
| C10 | 47uf | | |
| C11 | .01uf | | |
| C12 | .001uf | | |
| C13 | 10uf | | |
| C14 | 10uf | | |
| C15-C21 | .001uf | | |
| C22 | .001 | | |
| C50 | .1uf | | |
| C51 | 2.2uf | | |
| C60 | 1000pf | | |
| D1 | 1N5221 | | |
| D4 | 1N5221 | | |
| D6 | 1N4001 | | |
| D7 | 1N4734a | | |
| D8 | 1N5395 | | |
| D9 | 1N4736 | | |
| D10 | 1N4755 | | |
| D11 | 1N4004 | | |
| D12 | 1N4002 | | |
| D13 | 1N4755 | | |
| D14 | 1N4004 | | |
| D15 | MZP4746 | | |
| D16 | 1N4001 | | |

*Selected for desired output.

The invention may also be embodied in other specific forms without departing from the spirit or essential characteristics thereof. The foregoing description is therefore to be considered as illustrative and not restrictive, the scope of the invention being defined by the appended claims and all changes which come within the meaning and equivalency of the claims are therefore intended to be embraced thereby.

What is claimed is:

1. Apparatus for use on a vehicle having a main drive shaft and first and second output shafts operable for providing driving torque to wheels of said vehicle and means for coupling said main drive shaft to said first and second output shafts, said apparatus comprising:
   (a) means for sensing the relative rotational speed of said first and second output shafts, and
   (b) control means responsive to said sensing means detecting a slip condition and including means for eliminating said slip condition (c) means for actuating said means for eliminating said slip condition and providing a control signal,
   (d) said actuating means being operable for a predetermined time after actuation thereof and
   (e) failsafe timing means operable at a fixed time prior to the end of said predetermined time to deactivate said control means if said control signal is still present at said fixed time.

2. Apparatus as recited in claim 1 wherein said means for coupling said main drive shaft to said first and second output shafts is a differential and said actuating means is actuable for rotatably locking together two of the group of said main drive shaft and said first and second output shafts.

3. Apparatus as recited in claim 1 wherein said first output shaft is normally driven by said main drive shaft and said means for eliminating said slip condition comprises a clutch coupling said main drive shaft to said second output shaft.

4. Apparatus as recited in claim 1 wherein said wheels of said vehicle are provided with brakes and said means for eliminating said slip condition is effective to selectively control the application of said brakes.

5. Apparatus as recited in claim 1 wherein said failsafe timing means is operable for a short period of time.

6. Apparatus as recited in claim 5 wherein said fixed time is not greater than one minute.

7. Apparatus as recited in claim 1 wherein said fixed time is coterminous with said predetermined time.

8. Apparatus as recited in claim 1 wherein said vehicle has a brake and said apparatus further comprises:
   (a) means responsive to application of said vehicle brake for generating a brake signal, and
   (b) means connected to receive said brake signal for disabling operation of said control means, whereby said control means is inoperative for actuating said means for eliminating said slip condition upon application of said vehicle brake.

9. Apparatus as recited in claim 8 wherein said vehicle has a brake light circuit and brake lights actuable upon application of said brakes and said means responsive to application of said vehicle brake comprises means connected to said brake light circuit.

10. Apparatus as recited in claim 1 further comprising means connected to said brake light circuit for detecting an open circuit condition, and means for disabling operation of said control means upon detection of said open circuit condition, whereby said control means is deactivated upon detection of an open circuit condition in said brake light circuit.

11. Apparatus for use on a vehicle having a main drive shaft and first and second output shafts operable for providing driving torque to wheels of said vehicle and means for coupling said main drive shaft to said first and second output shafts, said apparatus comprising:
   (a) a sensor positioned adjacent each respective rotating shaft and generating signals having a frequency proportional to said respective rotational shaft speed,
   (b) gating circuit means for receiving said signals from each of said sensors, said gating circuit means operable for gating signals from each of said sensors,
   (c) means for counting said signals from said gating circuit means and for generating a differential signal upon detection of a predetermined difference in counts of said counting means,
   (d) timing means connected to receive said differential signal to generate a control signal for a predetermined time, and
   (e) drive means responsive to said control signal for eliminating said slip condition.

12. Apparatus as recited in claim 11 wherein said counting means comprises an up/down counter configured for counting up in response to signals from one of said sensors and for counting down in response to signals from the other of said sensors, and said gating circuit means alternately gates signals from said sensors to said counting means.

13. Apparatus as recited in claim 12 wherein said up/down counter is presettable and said control means further comprises means for resetting said up/down counter at fixed time intervals.

14. Apparatus as recited in claim 13 wherein said fixed up count is pre-set equal to said down count and said presettable up/down counter generates said differential signal upon exceeding either of said pre-set counts.

15. Apparatus as recited in claim 11 further comprising failsafe timing means for generating a failsafe signal, if said differential signal is present at a fixed time prior to expiration of said predetermined time, said failsafe signal connected to said counting means for preventing further generation of said differential signal.

16. Apparatus as recited in claim 15 wherein said vehicle has brakes and said apparatus further comprises circuit means responsive to application of said brakes for inhibiting transmission of said differential signal to said timing means.

17. Apparatus as recited in claim 15 wherein said vehicle has a brake light circuit and said apparatus further comprises means connected to said brake light circuit for sensing an open circuit condition thereof and for preventing further generation of said differential signal.

18. Apparatus as recited in claim 14 including a differential coupling said main drive shaft to said first and second output shafts and said control means is actuable for rotatably locking together any two of the group of said main drive shaft and said first and second output shafts.

19. Apparatus as recited in claim 18 wherein said vehicle has a clutch collar and cooperating fork and yoke assembly for rotatably locking said main shaft to one of said output shafts, and said drive means comprises a solenoid for actuating said clutch collar.

20. A method of improving slip correction in a vehicle having a main drive shaft and first and second output shafts operable for providing driving torque to wheels of said vehicle and means for coupling said main drive shaft to said first and second output shafts, said method comprising the steps of:
   (a) detecting a slip condition between two of the group of said main drive shaft and said first and second output shafts,
   (b) locking said coupling means for eliminating said slip condition,
   (c) maintaining said locked condition for a predetermined time, and
   (d) inhibiting locking of said coupling means if said slip condition is detected again prior to termination of said predetermined time.

21. A method as recited in claim 20 wherein said vehicle has brakes and said method further comprises the steps of:
   sensing the application of said vehicle brakes, and inhibiting locking of said coupling means in response to application of said vehicle brakes.

22. A method as recited in claim 20 wherein said vehicle has a brake light circuit and said method further comprises the steps of:
   sensing an open circuit condition of said brake light circuit, and
   terminating said method in response to said open condition of said brake light circuit.

* * * * *